Aug. 31, 1926.
W. R. FOX
1,597,780
MULTIPLE SPINDLE DRILLING MACHINE
Filed Dec. 30, 1924
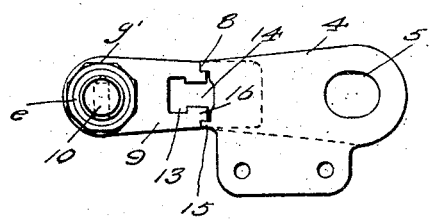
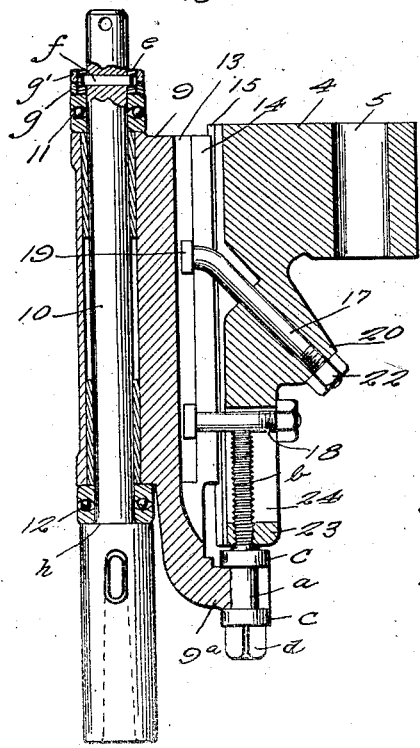
Inventor
William R. Fox
By Spear, Middleton, Donaldson & Hall
Attorney Patented Aug. 31, 1926.

1,597,780

UNITED STATES PATENT OFFICE.

WILLIAM R. FOX, OF JACKSON, MICHIGAN, ASSIGNOR TO FOX MACHINE COMPANY, OF JACKSON, MICHIGAN, A CORPORATION OF MICHIGAN.

MULTIPLE-SPINDLE-DRILLING MACHINE.

Application filed December 30, 1924. Serial No. 758,855.

The invention concerns multiple spindle drilling machines of the type disclosed in Letters Patent of the United States granted to W. F. Fox and E. W. Cleveland, No. 1,225,235, May 8, 1917, the present improvement relating to means for adjusting the spindle bearing vertically and to means for maintaining the spindle in proper relation vertically, and the invention consists in the features and combination and arrangement of parts hereinafter described and particularly pointed out in the claims.

In the accompanying drawings, Fig. 1 is a vertical sectional view of a part of a drilling machine embodying my invention.

Fig. 2 is a plan view of Fig. 1.

Fig. 3 is a detail.

In these drawings 4 indicates a supporting arm of a multiple drilling machine, having an opening 5 to receive a bolt which secures the arm to the main supporting head of the machine.

The arm on its vertical face is provided with a seat at 8 for the bearing 9 of the drill spindle 10, suitable ball bearings being arranged at 11 and 12 at the upper and lower ends of the bearing. The bearing has a vertical channel or way 13, 14, of T shape in cross section and face of the bearing is formed to fit the seat or face at 8 on the arm, as best shown in Fig. 2, the face of the arm having a guide way 15 to receive the projecting portion 16 on the face of the bearing.

In order to clamp the bearing to the arm, I provide bolts 17 and 18. The bolt 17 is arranged at an inclination to the vertical axis of the spindle bearing and thus inclines upwardly from its lower end, and its upper end is turned or bent and is provided with a head 19 fitted to the channel or way 13 in the bearing, the shank portion of the bolt at its upper end passing through the channel or way 14. The arm 4 is provided with an inclined bearing surface 20 and a nut 22 threaded onto the extreme lower end of the bolt bears on the arm.

The arm 4 has a downward extension 23 slotted at 24 for the passage of the bolt 18. The bearing 9 for the spindle is provided with a downward extension 9ª, which is notched at its lower end for the reception of the shank $a$ of an adjusting screw $b$ which passes through a threaded opening in the lower end of the part 23. This adjusting member has collars $c$, $c$ and a rectangular head $d$ by which latter the screw is turned. The collars $c$, $c$ embrace the forked or notched end of the arm 9ª and while permitting the adjusting member to be turned they retain the adjusting member in proper relation to the arm 9ª. By turning this member a micrometer adjustment of the bearing 9, together with its spindle can be obtained vertically, and in both directions, i. e. up and down.

In order to hold the spindle in proper relation vertically within its bearing 9 and to permit adjustment to compensate for wear of the ball bearings, I provide a collar $e$ fixed to the upper part of the spindle by a pin $f$. The collar is screw threaded on its exterior and receives two jam nuts $g$, $g'$.

This construction supports the spindle upon the upper ball race of the upper bearing and should wear take place within the ball races it can be taken up by adjusting the jam nuts.

With the construction described it is possible to accurately take up the lost motion caused by the wear of the balls and ball races. No screw threads are used on the spindles and they are kept of one diameter and in case the lock nuts should work loose the ball races can not separate a sufficient distance to lose the balls out.

The pin $f$ is of one diameter throughout. Both the spindle and the collar can be jig drilled. In assembling the spindle is placed in position through the bearing 9 and the ball bearings and the collar $e$ are then placed in position so that the opening therethrough registers with the opening in the spindle and the pin is then pushed into place, and without requiring a drive fit, the nuts $g$, $g'$ serving not only for adjustment but also to hold the straight pin $f$ in place. No machine work is necessary during the assembling operation.

It will be noticed that the spindle has an enlargement at its lower end furnishing a socket member. This enlargement presents a shoulder at $h$ and the ball bearing 12 is interposed between this shoulder and the bottom of the spindle bearing 9. The loosening of the nut above mentioned, when said nut is simply threaded onto the spindle allows the spindle to drop down so that the balls can drop out of the bearing at 12, but with my present arrangement the collar

*e* being fixed to the spindle by the pin, the spindle will be maintained in its proper position against dropping down, and the adjustment to compensate for wear is accomplished by means such as the jam nuts.

I claim:

1. In combination in a multiple spindle drilling machine, an arm having means for connecting it to the head of the machine and a vertical guideway, said arm havig a vertical slot adjacent said guideway, a spindle bearing mounted on said arm and adjustable along said vertical guideway, bolts mounted in the arm and having engagement with the spindle bearing to hold it in adjusted position, one of said bolts passing through the said slot, said spindle bearing having a downward, and laterally projecting arm, reaching under the slotted portion of the main arm and a micrometer screw rotatively mounted in said laterally extending arm and engaging a threaded opening in the lower wall of the slot of the main supporting arm, whereby said spindle bearing may be adjusted vertically, substantially as described.

2. In combination in a drilling machine, a supporting arm, a spindle bearing mounted thereon, a spindle passing through said bearing, ball bearings for the spindle at the top and bottom of the said bearing, a collar pinned to the spindle and threaded externally, and a nut on said collar, a jam nut also on the collar, said collar and nuts being above the ball race member of the upper ball bearing, substantially as described.

3. In combination in a drilling machine, a supporting arm, a spindle bearing mounted thereon, a spindle passing through said bearing, and having an enlarged portion below said bearing, a ball bearing between said enlargement and the bottom of the spindle bearing, a collar fixed to the spindle above the spindle bearing, said collar being threaded exteriorly, and nuts adjustable on said collar and in relation to said bearing, substantially as described.

4. In combination in a drilling machine, a supporting arm, a spindle bearing mounted thereon, a spindle passing through said bearing, a collar on the spindle, a pin extending transversely of the axis of the collar and spindle to hold the collar against displacement along the spindle, said collar being threaded externally, ball bearings between the spindle and its bearing arranged below the collar and nuts adjustable on the screw threads of the collar and in relation to the bearing, said nuts extending across the end of the pin and preventing displacement of the pin, substantially as described.

In testimony whereof I affix my signature.

WILLIAM R. FOX.